Patented May 1, 1951

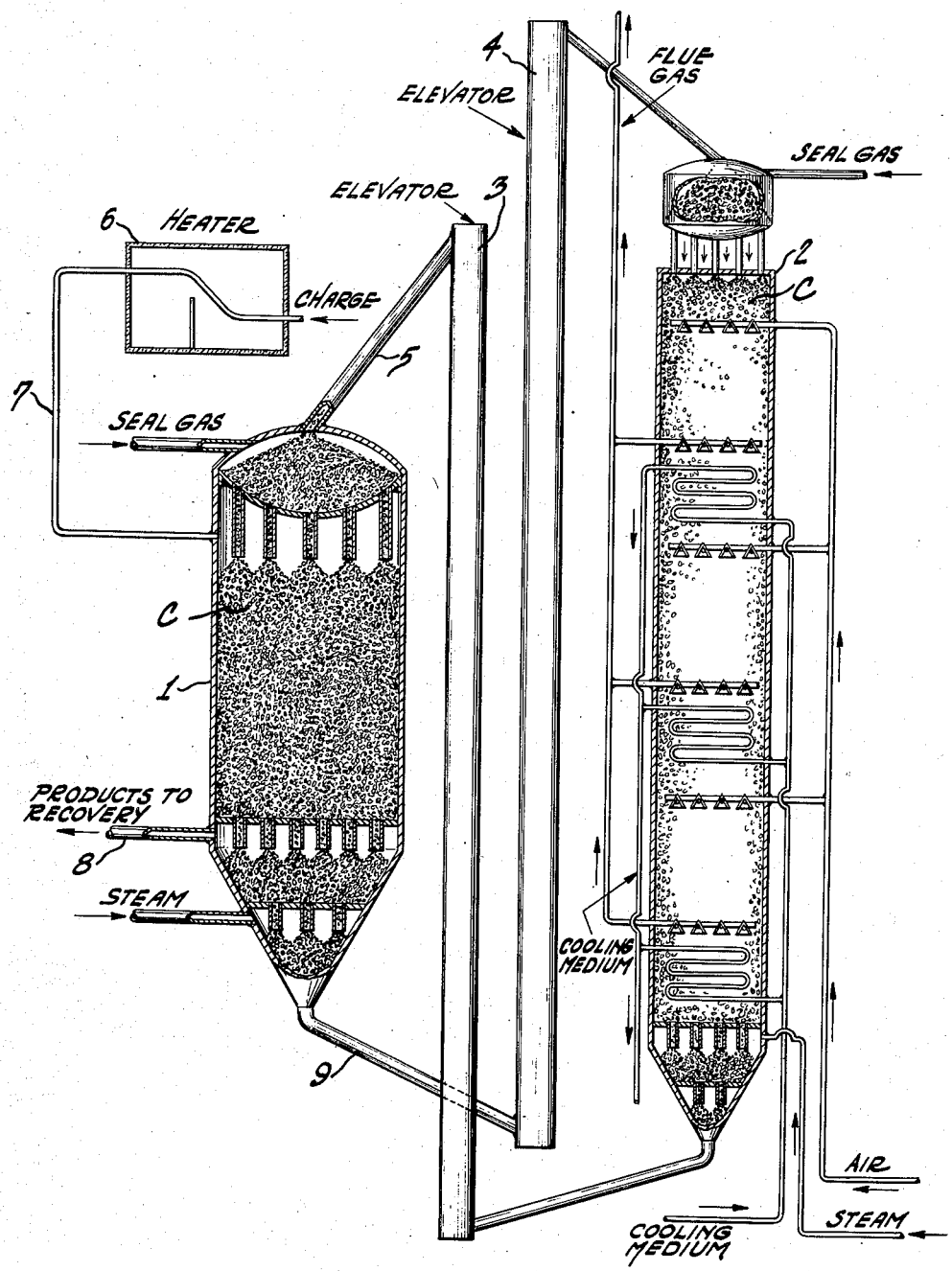

2,550,727

UNITED STATES PATENT OFFICE 2,550,727

METHOD OF CATALYTIC CRACKING OF HYDROCARBONS UTILIZING A MOVING CATALYST BED

Hans G. Shimp, Moylan, Pa., assignor to Houdry Process Corporation, Wilmington, Del., a corporation of Delaware Application September 27, 1947, Serial No. 776,451

2 Claims. (Cl. 196—52)

The present invention relates to catalytic cracking in the vapor phase of oils heavier than gasoline, for example, gas oils and the like, to produce gasoline and other desirable distillate products. In particular the invention deals with such cracking in a moving catalyst system. In such systems the catalyst usually flows alternately and repeatedly through a reaction or cracking vessel and a regeneration vessel, in which latter carbonaceous deposit accumulated on the catalyst during cracking is removed by controlled burning. The invention is concerned with operation of the cracking vessel through which, according to preferred aspects and embodiments of the invention, the catalyst flows as a downwardly moving stream, in most instances as a compact or substantially continuous bed.

In prior operation of systems of the character described the catalyst entered the reactor at temperature approximately or even somewhat above desired maximum cracking temperature. Simultaneously, preheated and vaporized oil charge was admitted to the reactor adjacent its bottom to flow countercurrently to the descending column of hot catalyst, the resulting reaction products being withdrawn from the reaction vessel adjacent the top of the moving bed of catalyst therein.

Three operating conditions controlled outside of the reactor determine largely the extent of cracking and yield of liquid products as well as quality of gasoline obtained in reactors of given catalyst content and charge capacity. These conditions, hereinafter termed control conditions, are: (1) the temperature of the catalyst as admitted to the reactor; (2) the ratio of catalyst and oil charges; and (3) the temperature to which the oil charge is preheated. Increase in any of these conditions results in increased total conversion or cracking of the charge to lower boiling products, gasoline and gas. Also, with each of these conditions at relatively high level, production of high anti-knock rating gasoline is favored.

There are practical limits, however, determined by yield and quality of liquid product, to the temperatures of admission of the oil and catalyst streams to the reactor. Thus, overheating of the oil produces thermal cracking, adversely affecting the quality of the gasoline product as well as producing relatively rapid coking of the heating equipment. On the other hand, excessive catalyst inlet temperatures result in overcracking of vapor charge to non-liquid products, gas and coke.

It has been proposed to achieve high yields of liquid including high octane gasoline by use of high feed rates of catalyst with respect to the charge. Since equipment for moving the catalyst and the actual movement of the same represent substantial items in the investment and operating costs, respectively, of the cracking plant, use of high ratios of catalyst to oil results in relatively high processing costs. In addition, high ratios of catalyst to oil at otherwise equal conditions tend to increase conversion of charge to non-liquid products.

When, in prior operating methods, it has been deemed advisable to use low ratios of catalyst and oil feed rates it has often been found necessary to so regulate the control conditions, in the interest of achieving either quality of gasoline or yield of liquid product that the most favorable balance of these is not obtained.

It has been discovered in accordance with the invention that substantially improved operation, reflected in high quality of gasoline and high yield of liquid product, is obtained in cracking systems of the type described when the moving compact body or bed of catalyst and preheated oil charge vapors are admitted to the reactor to flow downwardly and concurrently therethrough, resulting reaction products being withdrawn from the reactor after separation from the bed of catalyst adjacent the lower portion of the bed. It is one of the features of the invention that in its practice the rates of feed, oil vapors and catalyst to the reactor are so controlled that the heat capacity of the oil is at least equal to and preferably greater than that of the catalyst. Surprisingly, at such ratios of catalyst to oil, which are relatively low, the advantages of high ratios are realized without the expense and other disadvantages attendant upon their use.

With typical cracking catalysts presently in commercial use, for example, pellets or granules of acid activated bentonitic clays or of synthetically prepared silica and alumina gel composites, the maximum ratio of catalyst to oil contemplated by the invention, equality of their heat capacities, lies within the range of 3.5 to 4.0, volumetric basis, for most vaporizable charge stocks. This volumetric relationship is expressed in terms of volume of a common size and shape of commercial pelleted catalyst (4 mm. x 4 mm. cylinders) per volume of charge in liquid or unvaporized condition. It is to be understood that equivalent volumetric ratios may be used with catalysts of different physical form or heat capacities (apparent density of normally packed catalyst particles multiplied by specific heat of the catalytic material).

In practice of the invention, although relatively low catalyst to oil feed rates are contemplated, the quantity of catalyst should be sufficient that a substantial proportion of the sensible heat supplied to the cracking zone be sensible heat content of the catalyst. Thus, the heat capacity of the catalyst feed should be at least one-third and preferably at least half the heat capacity of the oil vapors.

For further description of the invention reference may be had to the single figure of drawing, which is a flow chart illustrating diagrammatically one embodiment thereof.

As the drawing indicates, the cracking system comprises reactor 1 and regenerator or kiln 2, each being shown in schematic sectional elevation. Cracking catalyst C, for example, in the form of granules or molded units, is moved continuously and alternately through reactor 1 and kiln 2, preferably flowing downwardly through each as a substantially solid bed. Suitable conveyors, for example, mechanical elevators 3 and 4, transport the catalyst between kiln 2 and reactor 1 to maintain catalyst circulation at desired rate.

Regenerated catalyst at relatively high catalytic cracking temperature, above 850° F. but preferably not in excess of about 1050° F. is admitted to the top of reactor 1 as by line 5, and, preferably after being uniformly distributed across the reactor, is flowed downwardly therethrough concurrently with hot vaporized oil charge which has been preheated in fired heater 6 and brought to the upper portion of reactor 1 by transfer line 7 at cracking temperature of at least 820° F. but preferably not in excess of about 925° F., above which thermal cracking becomes pronounced.

In reactor 1 the catalyst drops in temperature over a range of cracking temperatures which in practice of the invention is usually of the order of 50 to 150° F. and resulting cracked products leave the reactor as by products line 8 after being separated from the catalyst.

The latter, after being purged of absorbed hydrocarbons, for example, by steam admitted into elevator feed line 9 is transported to kiln 2 in which carbonaceous or coky deposit resulting from the cracking reactions is removed from the catalyst under controlled burning conditions which result in increase of catalyst temperature over the above range and delivery of the regenerated catalyst to reactor 1 and into contact again with hot charge vapors at the desired relatively high cracking temperature. As shown, the regeneration may be effected by admission of air or other suitable oxygen-bearing regenerating medium to kiln 2 and the catalyst therein at a plurality of spaced levels, the resulting flue gases being withdrawn at intermediate levels. As is often required by the concentration of deposit on the catalyst, the regeneration and final delivery temperature to the reactor may be controlled by use of a suitable number of indirect heat exchange members disposed in kiln 2 through which a suitable heat exchange or cooling medium is circulated.

During regeneration and especially during the latter portion thereof the catalyst temperature is elevated or is so regulated that, upon being discharged from kiln 2 into elevator 3 and conveyed by the latter and catalyst line 5 into the top of reactor 1, it is at cracking temperature, preferably somewhat above that of the preheated and vaporized charge. Before leaving kiln 2 the heated catalyst is purged of any residual content of combustion supporting gas as by use of a suitable inert fluid, for example, steam.

In order to prevent commingling of reaction fluids, air and hydrocarbons, present in kiln 2 and reactor 1, respectively, the purging medium as admitted to each is at pressure somewhat higher than that obtaining within the catalyst at the nearest outlet for flue gas or hydrocarbon products. Also, to maintain reactor and kiln pressures at the desired level, usually low superatmospheric pressure, a suitable inert seal gas is admitted to the kiln and reactor at a level above that at which reactants, combustion supporting medium and hydrocarbon charge, respectively, are admitted to the catalyst. The seal gas, which may be carbon dioxide or flue gas free or substantially so of uncombined oxygen, is supplied at pressure somewhat above desired reaction pressure to insure that the regenerating medium and hydrocarbons are contained within their respective reaction vessels. It is usually desirable to maintain a substantial pressure differential between elevator 3 and reactor 1 which it feeds, to which end a pressure leg comprising a vertical column of catalyst (not shown) may be interposed therebetween. Suitable pressure differential between kiln 2 and elevator 4 may be similarly obtained and maintained.

In practice of the invention the relative rates of flow of hot catalyst and preheated vaporized charge are preferably established so that the heat capacity of the charge is somewhat greater than that of the hot catalyst. Under these conditions, the ultimate control of cracking temperatures (the integrated average temperature of oil and catalyst within the reactor) is effected through the temperature of the entering charge, small change in the last named temperature resulting in substantial adjustment of cracking severity corresponding approximately to the relative heat capacities of the two streams. Such temperature change of charge is easily effected by simple adjustment of fired heater 6 without necessitating modification of the regenerating conditions. In fact, it is one of the features of the invention in its preferred aspects that ultimate control of cracking temperature be effected by regulation of oil feed temperature while feeding the hot regenerated catalyst to the reactor at constant or substantially constant temperature, for example, within the range of 850° F. to 1050° F. but preferably above about 900° F.

One of the important advantages of the invention is that in its practice high yields of high quality motor gasoline are obtained with economically low capacity of equipment for handling and moving the catalyst. Moreover, surprisingly enough, when the concurrent flow and limited relative rates of feed of catalyst and oil characteristic of the invention are used the quality of motor fuel (and sometimes its yield) is improved over that obtained with different flow methods at otherwise identical quantities and temperatures of oil and catalyst feeds. Unexpectedly, these advantages are obtained without sacrifice of additional conversion of charge to coky deposit which must be removed from the catalyst during regeneration. In fact, in many instances the invention yields smaller quantities of such deposit than obtained with other methods yielding equivalent quantities and quality of motor fuel, permitting increased reactor or conversion capacity with respect to concomitant burning or regenerator capacity.

Certain of the above advantages and others accruing to practice of the invention are reflected in the following specific and typical examples:

Example 1

This example presents a comparison of two runs (run A and run B) on identical charge stock (East Texas gas oil having A. P. I. gravity of about 36° and boiling range of about 420° F. to 740° F.) using the same catalyst flowed through a vertical reactor as a solid gravitating bed of pelleted granules. The catalyst was activated clay of the bentonite type having an activity index of about 30 as measured by the method described in detail in the publication, "Laboratory Method for Determining the Activity of Cracking Catalysts" by J. Alexander and H. G. Shimp, page R-537, National Petroleum News, August 2, 1944. Run A was made in accordance with the process of the invention, the vaporized charge flowing through the reactor for substantially the entire depth of the catalyst bed therein concurrently with the catalyst flow. In run B, effected in accordance with prior procedure, the conditions of space velocity, oil and catalyst feed temperature and relative rates of feed, reactor pressure and other general conditions were substantially identical with those employed for run A, excepting the direction of flow of the charge through the reactor. In run B the hot vaporized charge was admitted adjacent the bottom of the reactor and products were withdrawn adjacent the top of the moving bed of catalyst.

The comparative conditions of runs A and B and the yields of products with inspections of motor gasoline obtained are summarized in the following table:

|  | Run A | Run B |
|---|---|---|
| OPERATING CONDITIONS | | |
| Space Velocity, Volumes original liquid charge per hour and per volume of catalyst in reactor | 0.81 | 0.78 |
| Ratio of Catalyst to Oil Charge, volume/volume | 2.05 | 2.03 |
| Charge Feed Temperature, °F | 900 | 900 |
| Catalyst Feed Temperature, °F | 1000 | 1000 |
| Steam Feed with Charge, Per cent Wt. of charge | 9.7 | 10.2 |
| Reactor Pressure, Lbs./sq. in. gauge | 10 | 10 |
| YIELDS BASED ON CHARGE | | |
| 10 Lb. R. V. P. Motor Gasoline, 370° F. @ 90%, Per Cent Vol | 37.9 | 36.5 |
| $C_4$ Free Motor Gasoline, 370° F. @ 90%, Per Cent Vol | 35.8 | 34.2 |
| Catalytic Gas Oil (420° F. to 750° F.), Per Cent Vol | 49.7 | 54.5 |
| Conversion, Per Cent Vol. (100% Less Cracked Fuel) | 50.3 | 45.5 |
| Total $C_4$'s, Per Cent Vol | 12.4 | 10.3 |
| Total Recovered Liquid ($C_4$'s and heavier), Per Cent Vol | 97.9 | 99.0 |
| Dry Gas ($C_3$'s and lighter), Per Cent Wt | 6.2 | 5.0 |
| Coke, Per Cent Wt.: | 3.3 | 2.9 |
| Octanes of Motor Gasoline (10 Lb. R. V. P.) | | |
| By Method F-2 (CRC Designation F-2-545, CRC Handbook, 1946 Edition) unleaded | 80.1 | 78.7 |
| By Method F-1 (CRC Designation F-1-545, CRC Handbook, 1946 Edition) unleaded | 91.0 | 88.5 |
| +1 cc. TEL/gal | 95.1 | 92.3 |
| +3 cc. TEL/gal | 97.8 | 94.4 |

Under the conditions of these runs heat capacity of the oil feed was approximately 1.8 times that of the catalyst.

It is to be noted from this example that the process of the invention yields substantially improved octane motor fuel in higher yield at identical oil feed and catalyst feed temperatures. In fact, the gain of gasoline yield in run A over run B is greater than the loss of liquid product.

Example 2

A third run (run C) on the same charge and catalyst as used in runs A and B was performed, in accordance with the process of the invention, under conditions to produce motor fuel of quality equivalent to that obtained from run B. Essentially space velocities and catalyst-to-oil ratios were the same as used in runs A and B as well as quantity of steam fed with the charge and reactor pressure. The operating conditions and results of this run are as follows:

| Operating Conditions | Run C |
|---|---|
| Space Velocity | 0.82 |
| Catalyst/Oil | 1.98 |
| Charge Feed Temperature, °F | 840 |
| Catalyst Feed Temperature, °F | 885 |
| Steam | 9.2 |
| Reactor Pressure | 10 |
| Yields Based on Charge: | |
| Gasoline 10 Lb. R. V. P. (370° F. @ 90%) | 36.8 |
| $C_4$ Free Gasoline | 34.8 |
| Catalytic Gas Oil | 54.8 |
| Total $C_4$'s | 10.4 |
| Total Liquid Recovery | 100 |
| Dry Gas, $C_3$'s and lighter | 4.6 |
| Coke | 2.5 |
| Octanes of Gasoline (10 Lb. R. V. P., 370° F. @ 90%): | |
| F-2 Method, unleaded | 78.7 |
| F-1 Method, unleaded | 88.6 |

It is evident from this run that practice of the invention achieves, without sacrifice of quality of gasoline, yields of gasoline and liquid products at least equal to and even somewhat greater than obtained by countercurrent flow of the catalyst bed and oil charge vapors at the same relative rates of feed of these materials. This result is obtained at lower temperatures of such feeds and with concomitant production of smaller quantities of coky deposit than indicated for run B. In operating a commercial scale cracking unit of a capacity commonly used (10,000 barrels of charge per day) the quantity of coke deposit under the conditions of run C would approximate about 520 pounds of coke per hour less than obtained at the conditions of run B, permitting equivalent reduction in rate of burning in the kiln.

As mentioned above, in practice of the invention the catalyst and oil vapors decrease gradually in temperature while flowing through the reactor. Since, by preference, the catalyst as admitted thereto is at higher temperature than the hot oil vapors, the catalyst imparts heat to the oil, heating it rapidly to the desired initial cracking temperature. After this initial preheating of the oil, a gradual temperature decline occurs until the catalyst and oil vapors containing gasoline are separated adjacent the bottom of the reactor. In view of the fact that the heat capacity of the oil vapors is greater than that of the catalyst the average temperature level attained by the catalyst and oil approaches and even approximates that of the oil feed, avoiding excessive localized oil temperatures and overcracking of the charge to coky deposit.

On the other hand, when, according to prior practice, the oil vapors are admitted adjacent the bottom of the reactor to flow countercurrently to the catalyst, the latter declines gradually in temperature while flowing through the upper and central portions of the reactor to levels substantially below oil feed temperature. The catalyst then becomes reheated toward oil feed temperature in the bottom portion of the same. As a result, although higher localized cracking temperature may be obtained by the prior method, the average cracking temperature within the reactor is considerably lower than realized in practice of the invention with identical catalyst and oil feed temperatures. Thus, in run A of Example 1, the average cracking temperature was somewhat above that of the oil charge, about 905° F. In run B the average temperature was substantially below that level, or about 850° F. In run C also average temperature of about 850° F. was obtained, despite the relatively low temperatures of oil and catalyst feed.

In order to obtain, by prior methods in which charge oil vapors pass countercurrently to the compact bed of catalyst, the high quality of motor gasoline realized by practice of the invention at relatively high temperatures and as exemplified by run A, it has been necessary to resort to ratios of catalyst to oil feeds such that the heat capacity of the catalyst exceeds that of the oil. For example, to achieve with the countercurrent flow the average cracking temperature of run A with the same cracking stock, catalyst and other general conditions of run A, it has been necessary to utilize catalyst-to-oil ratios above about 4. At these conditions the gasoline product was obtained at the expense of higher yields of gas and coke than produced by run A.

In addition, with the prior practice, desired increase in severity of cracking to obtain the high quality of product characteristic of preferred application of the invention was practically impossible of attainment by adjustment of the temperature of the oil charge. The charge temperatures necessary were well within the range at which thermal cracking depreciates quality of gasoline. On the other hand, in practice of the invention, there is, unexpectedly, at low ratios of catalyst to oil feeds and at desirably low oil feed temperatures, more direct and efficient utilization of the total heat content of the catalyst and oil feeds. It is therefore evident that the process of the invention provides for highly flexible operation to meet requirements as they may change for quality and yield of gasoline and for yield of other products, including catalytic gas oil.

Although the above examples, for purposes of comparison, deal with runs effected at but one space velocity, quantity of steam feed and pressure, it is to be understood that the invention contemplates other specific levels of these conditions that it is or may become desirable or practical to use. For example, space velocities may lie within or outside the range of about 0.4 to 3.0. With some charging stocks, for example, relatively heavy gas oils, larger or smaller quantities of steam feed may be used. With relatively light charging stocks which may be considered to include East Texas gas oil of the character used in the runs of the specific examples, it is sometimes desirable to use smaller quantities of steam feed or none at all.

In connection with the above examples, it should be pointed out that the anti-knock ratings obtained by run A are high considering the degree of conversion of the charge employed to gasoline, dry gas and coke, respectively, and considering the nature of that charge and the catalyst. Other charging stocks, for example, light and heavy gas oils of naphthenic base crudes tend to yield even higher octane ratings. Also certain cracking catalysts among the general class of cracking catalysts, all of which are suitable for practice of the invention, tend to produce higher octant rating motor fuels than do clay catalysts of the type employed in the runs of the specific examples. Catalysts tending to produce the higher octanes include composites of synthetically prepared silica and alumina derived from precipitated gels and preferably substanially free of any alkali metal compounds that may have been used in their preparation.

The invention is susceptible of variations and modifications of the foregoing description and explanation thereof that are included within the scope of the appended claims.

I claim as my invention:

1. In a hydrocarbon cracking system in which granular hydrocarbon cracking catalyst continuously circulates through a system comprising a hydrocarbon cracking zone in which a downwardly moving compact non-turbulent bed of said catalyst contacts hydrocarbon material boiling higher than gasoline under cracking conditions and thereby concomitantly accumulates a coky deposit and a regeneration zone in which coked catalyst from the cracking zone contacts oxygen containing gas under combustion conditions so as to remove a predetermined amount of coky deposit and thereby reactivate said coked catalyst; the method of maintaining constant the amount of coke deposited on said catalyst in the cracking zone and simultaneously obtaining relatively high yields of high octane gasoline from said hydrocarbon material at relatively low rates of catalyst flow, which method comprises establishing relative rates of flow of streams of catalyst and of hydrocarbon material through the cracking zone such that the heat capacity of the stream of hydrocarbon material introduced to the cracking zone is greater than that of the stream of catalyst introduced to the cracking zone but less than twice as great, introducing said stream of catalyst to the cracking zone at a substantially constant temperature considerably above the average temperature of the bed of catalyst therein, introducing said stream of hydrocarbon material to the top of the cracking zone at a temperature below the temperature of the stream of catalyst introduced to the cracking zone, passing said hydrocarbon material in vapor state downwardly through said bed of catalyst, reactivating coked catalyst under constant combustion conditions in said regeneration zone, and adjusting the temperature of introduction of said stream of hydrocarbons to the cracking zone so as to maintain a constant severity of cracking of said hydrocarbon material in said cracking zone.

2. In a hydrocarbon cracking system in which granular hydrocarbon cracking catalyst continuously circulates through a system comprising a hydrocarbon cracking zone in which a downwardly moving compact non-turbulent bed of said catalyst contacts hydrocarbon material boiling higher than gasoline under cracking conditions and thereby concomitantly accumulates a coky deposit and a regeneration zone in which coked catalyst from the cracking zone contacts oxygen containing gas under combustion conditions so as to remove a predetermined amount of coky deposit and thereby reactivate said coked catalyst; the method of maintaining constant the amount of coke deposited on said catalyst in the cracking zone and simultaneously obtaining relatively high yields of high octane gasoline from said hydrocarbons at relatively low rates of catalyst flow, which method comprises establishing relative rates of flow of streams of catalyst and of hydrocarbon material through the cracking zone such that the heat capacity of the stream of hydrocarbon material introduced to the cracking zone is greater than that of the stream of catalyst introduced to the cracking zone but less than one and a half times as great, introducing said stream of catalyst to the cracking zone at a substantially constant temperature considerably above the average temperature of the bed of catalyst therein and in the range of 850° F. to 1050° F., introducing said stream of hydrocarbon material to the top of the cracking zone at a temperature above about 850° F. and below the temperature of the stream of catalyst introduced to the cracking zone, passing said hydrocarbon material in vapor state downwardly through said bed of catalyst, reactivating coked catalyst under constant combustion conditions in said regeneration zone, and adjusting the temperature of introduction of said stream of hydrocarbons to the cracking zone so as to maintain a constant severity of cracking of said hydrocarbon material in said cracking zone.

HANS G. SHIMP.

REFERENCES CITED

The following references are of record in the file of this patent:

UNITED STATES PATENTS

| Number | Name | Date |
|---|---|---|
| 2,379,408 | Arveson | July 3, 1945 |
| 2,403,375 | Kassel | July 2, 1946 |
| 2,418,679 | Utterback | Apr. 8, 1947 |
| 2,440,822 | Hachmuth | May 4, 1948 |
| 2,441,170 | Rose et al. | May 11, 1948 |

OTHER REFERENCES

"Commercial T. C. C. Operations on Partially Vaporized Charge Stocks," Noll et al., Houdry Pioneer, vol. 2, No. 1, Oct. 1946.

"Recent Developments in Thermofor Catalytic Cracking Process," Simpson et al., Nat. Pet. News, Dec. 1, 1943.